United States Patent [19]

Komamura et al.

[11] 4,368,260
[45] Jan. 11, 1983

[54] PHOTOGRAPHIC LIGHT SENSITIVE ELEMENT

[75] Inventors: Tawara Komamura; Jiro Takahashi; Ryuichiro Kobayashi, all of Hachioji, Japan

[73] Assignee: Konishiroku Photo Industry Co., Ltd., Japan

[21] Appl. No.: 333,900

[22] Filed: Dec. 23, 1981

[30] Foreign Application Priority Data

Dec. 27, 1980 [JP] Japan .................. 55-188970

[51] Int. Cl.³ .................. G03C 1/40; G03C 1/10
[52] U.S. Cl. .................. 430/562; 430/222; 430/223; 430/226; 260/146 R
[58] Field of Search .................. 430/222, 223, 225, 226, 430/561, 562, 563

[56] References Cited

U.S. PATENT DOCUMENTS 3,563,739 2/1971 Idelson .................. 430/224
4,139,383 2/1979 Odenwalder et al. .................. 430/223
4,142,891 3/1979 Baigtie et al. .................. 430/223

Primary Examiner—Richard L. Schilling
Attorney, Agent, or Firm—Finnegan, Henderson, Farabow, Garrett & Dunner

[57] ABSTRACT

A photographic light-sensitive element which comprises on a support a light-sensitive silver halide emulsion layer and having associated therewith a non-diffusible compound capable of, under alkaline condition, releasing a diffusible azo dye, said compound having the formula (1),

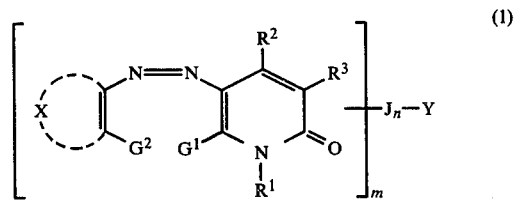

wherein X represents a group of atoms necessary to complete a naphthalene ring or a benzene ring, $G^1$ represents a hydroxy group, a salt thereof or a hydrolyzable precursor thereof, $G^2$ represents a carboxy group, a salt thereof or a hydrolyzable precursor thereof, a hydroxy group, a salt thereof or a hydrolyzable precursor thereof, $R^1$ is a hydrogen atom, an alkyl group or an aryl group, $R^2$ is a hydrogen atom, an alkyl group or an aryl group, $R^2$ represents a hydrogen atom, a halogen atom, an alkyl group, a carboxy group, a carbamoyl group or an amino group, each of which group may be substituted, $R^3$ represents a hydrogen atom, a carboxy group, a carbamoyl group, a cyano group or a trifluoromethyl group, J represents a divalent linking group, Y represents a ballasted carrier moiety capable of releasing said diffusible dye under alkaline condition as a function of development of silver halide, m represents an integer of 1 to 3 and n represents zero or an positive integer not larger than m.

4 Claims, No Drawings

PHOTOGRAPHIC LIGHT SENSITIVE ELEMENT

The present invention relates to a color diffusion transfer light-sensitive element containing color image forming materials, and more particularly to a color diffusion transfer photographic light-sensitive element containing a nondiffusible yellow dye image forming material capable of releasing a metallic complex-formable azo dye (including a precursor thereof) which is diffusible in an alkaline condition, the released dye forming a very stable metallic complex azo dye with a multivalent metallic ions.

Color diffusion transfer azo dyes that contain metallic complex formable groups include azo dye developing agents which are described in, e.g., U.S. Pat. No. 3,081,167, No. 3,196,014, No. 3,299,041, No. 3,453,107, No. 2,563,739, No. 3,544,545, No. 3,551,406, and No. 4,014,700. However, the developer component, because of being a reactive group, has the possibility that it does not develop the adjacent silver halide in combination therewith but develop light-exposed portions of all the emulsion layers contiguous thereto. Accordingly, such dye developing system may sometimes give rise to an undesirable interlayer effect (inter-image effect). Thus, it is desirable that improvements be made so that, for example, such a reactive component as the developer component is not attached to the dye in the course of diffusing, and the dye is liable to diffuse uniformly throughout the photographic film unit without being immobilized in the undesirable region.

In order to make up for such a drawback (interlayer effect) as well as to utilize the excellent nature (particularly the excellence in the light fastness of the metallic complex azo dye, there should be used such a dye that the dye released from a nondiffusible dye releasing material does not form a metallic complex while in the course of diffusing but easily form a complex with the metal contained in the image receiving layer or in the layer adjacent thereto to provide a metallic complex-forming dye at the time of or immediately before completion of the diffusion transfer. Photographic light-sensitive elements employing dyes having such the nature are described in U.S. Pat. No. 4,142,891, No. 4,147,544, No. 4,148,641, No. 4,148,642, No. 4,148,643, and Research Disclosure No. 17334 (1978) and No. 18022 (1979). However, the yellow dye has a small molar extinction coefficient compared to other dyes in different colors (magenta, cyan), and consequently, in order to form a yellow color on a level in the appearance with those of magenta and cyan dyes, the yellow dye must be used in a larger quantity than that of magenta or cyan dye. Accordingly, there is desired to be developed such a novel yellow dye as having a larger molar extinction coefficient as well as such natures indispensable to a diffusion transfer dye as satisfactory hue, the stable hue over a wide pH range of the system, sufficient light resistance, excellent diffusibility, and the like.

The present invention is characterized by the use of a diazo component (the component to provide a diazonium salt in the coupling reaction at the time of synthesizing an azo dye is hereby defined as a diazo component, while the component to couple therewith is defined as a coupler) which is a 2-aminobenzoic acid derivative, 2-aminophenol derivative, 2-amino-3-naphthalenic acid derivative, or 2-amino-3-naphthol derivative, particularly preferably a 2-aminobenzoic acid derivative or 2-amino-3-naphthalenic acid derivative, and a coupler component which is a 2-hydroxy-6-pyridone derivative, whereby an excellent diffusion transfer yellow dye having a larger molar extinction coefficient has been obtained. This dye, while in the course of a processing, is imagewise released and diffused at a satisfactory diffusing speed into the image receiving layer or into the layer contiguous thereto to be contacted with metallic ions to thereby form a metal-complexed azo dye, to form a dye image in the image receiving layer, having a good stability against heat, light and chemical reagents and excellent and stable hue over wide range of pH range.

SUMMARY OF THE INVENTION

The photographic light-sensitive element of the present invention is characterized by having on a support at least one light-sensitive silver halide emulsion layer and a nondiffusible dye releasing compound, the compound having at least one diffusible azo dye portion represented by the formula (1)

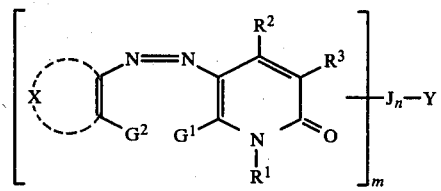

Formula (1)

wherein X represents an atomic group necessary to complete naphthalene ring or benzene ring, $G^1$ is a hydroxy, a salt thereof, or a hydrolyzable precursor thereof, $G^2$ is a carboxy, a salt thereof, or a hydrolyzable precursor thereof, a hydroxy group, a salt thereof or a hydrolyzable precursor thereof, $R^1$ is hydrogen, an alkyl or aryl, $R^2$ is hydrogen or halogen, an alkyl, carboxy, carbamoyl, or amino, $R^3$ is hydrogen, carboxy, carbamoyl, cyano, or trifluoromethyl, J is a divalent linking group, Y is a ballasted carrier moiety that can release the foregoing diffusible azo dye in an alkaline condition, m is an integer of from 1 to 3, and n is zero or a positive integer of not more than m.

The divalent linking group represented by J in Formula (1) is preferably expressed as $-[L-(NR^4)uM-v]-w$ or $-[L-Mv(NR)u]-w$ wherein (a) L represents a linking group expressed as $-R^5-(O)x-R^6y-$, wherein $R^5$ and $R^6$ each is a phenylene, substituted phenylene, alkylene, substituted alkylene, arylene-alkylene, substituted arylene-alkylene, the $R^5$ and $R^6$ being permitted to be either the same or different from each other, and x and y each is an integer of zero or 1, (b) M represents a carbonyl or sulfonyl, (c) $R^4$ is hydrogen, an alkyl or substituted alkyl, (d) u and v each is an integer of zero or 1, and (e) w is an integer of zero, 1 or 2.

When the w is an integer of 2, L, $R^4$ and M may be either the same or different from one another, J is connected at one end with Y and at the other end with naphthalene ring or benzene ring, or it may be connected with the groups $R^1$, $R^2$ or $R^3$. In the case of n=0, Y is connected directly with naphthalene ring or benzene ring. When the m is an integer of 2 or more, two or more dyes (in the same number as m) are to be released.

DETAILED DESCRIPTION OF THE INVENTION

It is generally known that the use of 6-hydroxy-2-pyridone derivatives as the coupler component enables to produce dyes having larger extinction coefficient, but these cannot satisfy all such characteristics essential to diffusion transfer photographic dyes as hue, the stability of hue over a wide pH range of the system, diffusibility, resistance to light, and the like.

We have found that when a 2-hydroxy-6-pyridone derivative is selected as a coupler in order to obtain a dye having a larger extinction coefficient, the selection of carboxy or hydroxy group, preferably carboxy group as a chelating group of the diazo component is important for obtaining an excellent yellow dye having a stable hue in a wide pH range of the system, and the use of this dye enables an excellent photographic nature-provided diffusion transfer metallic complex-forming yellow dye releasing compound.

A preferred example of the nondiffusible dye releasing compound is a compound containing as the diffusible azo dye portion a 3-(2-carboxyphenyl azo)-2-hydroxy-6-pyridone derivative that is obtained by coupling a 2-aminobenzoic acid derivative having the following formula (4) as a diazo component with a 2-hydroxy-6-pyridone derivative as a coupler.

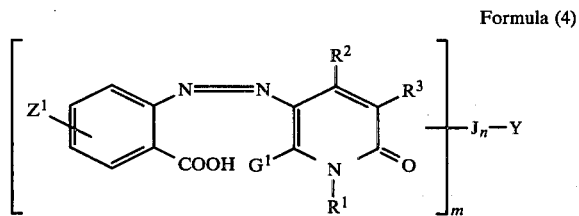

Formula (4)

wherein $Z^1$ is a substituent, preferably, hydrogen, halogen, methyl, trifluoromethyl, nitro, methoxy, sulfamoyl, etc., selected so as to provide an appropriate hue in combination with the substituents ($R^1$, $R^2$ and $R^3$) on the 2,6-dihydroxypyridine nucleus, and $G^1$, $R^1$, $R^2$, $R^3$, J and m and n are the same as those defined in Formula (1).

Another preferred example of the nondiffusible azo dye releasing compound of the present invention is a compound containing as the diffusible azo dye portion a 3-(3-carboxy-2-naphthyl azo)-2-hydroxy-6-pyridone derivative, the said compound having the formula (5)

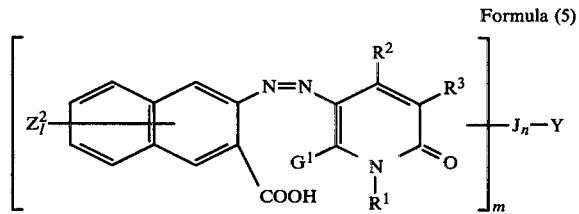

Formula (5)

wherein $Z^2$ is hydrogen, halogen, nitro or sulfamoyl, l is an integer of 1 or 2, and $G^1$, $R^1$, $R^2$, $R^3$, J, Y, m and n are the same as those defined in Formula (1).

In the above formula, when the precursor of a hydrolyzable hydroxyl group is used as $G^1$, the absorption spectrum of this diazo dye becomes shifted toward shorter wavelength region, and then the shifted dye becomes absorbing the light outside the region to which the silver halide layer containing said dye senses, so that the silver halide and the dye releasing compound may be present together in a same layer.

In the present invention, as the ballasted carrier portion, those conventionally known may be arbitrarily used, but examples of groups usable to Y or Y—J— include those having the formula (6)

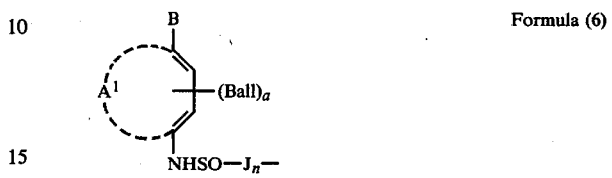

Formula (6)

wherein Ball represents an organic ballast group having such a number of carbon atoms as to enable the compound to be nondiffusible during development in an alkaline processing composition, $A^1$ represents group necessary to form a benzene ring a naphtahalene ring or a neterocyclic ring like pyrazolone, pyridine and the like, B represents $OR^7$ or $NHR^8$ (wherein $R^7$ is hydrogen or a group which is hydrolyzable to provide hydroxy group, and $R^8$ represents hydrogen, or an alkyl or a substituted alkyl having 1 to 20 carbon atoms, the alkyl being also able to act by itself as Ball), J and n are as defined in Formula (1), and a is an integer of 1 or 2.

Examples of the group represented by Formula (6) include the following:

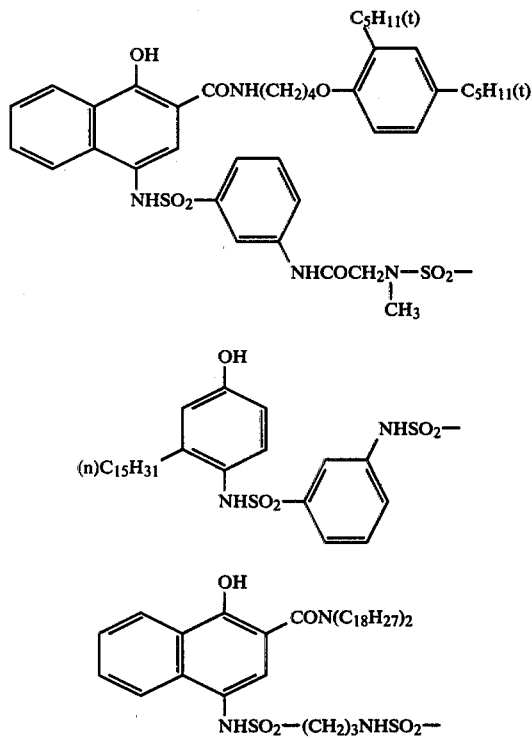

This kind of Y—$J_n$— is described in detail in Japanese Patent Publication Open to Public Inspection (hereinafter referred to as Japanese Patent O.P.I. Publication) No. 33826/1973 and No. 50736/1978.

As a preferred example of another Y—$J_n$—, there is a group having the formula (7)

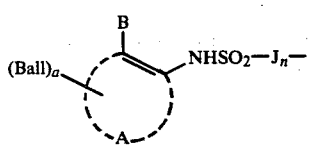

Formula (7)

wherein Ball, A, B, J, n and a are the same as defined in Formula (6), and those groups represented by Formula (7) include the following examples:

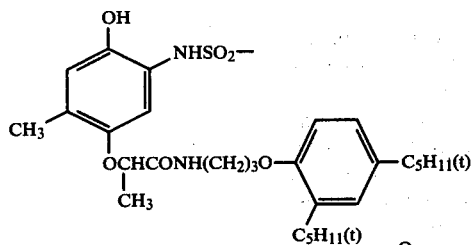

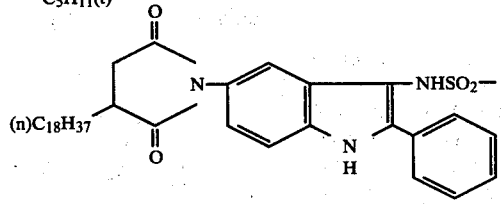

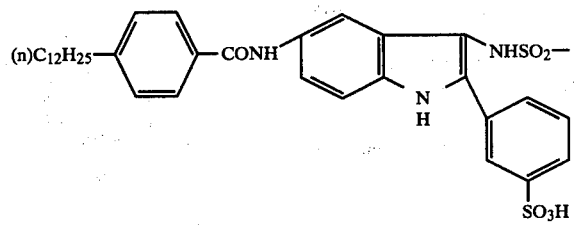

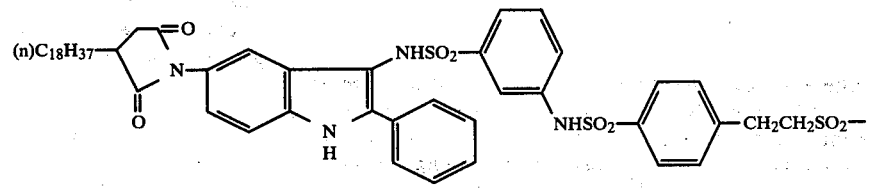

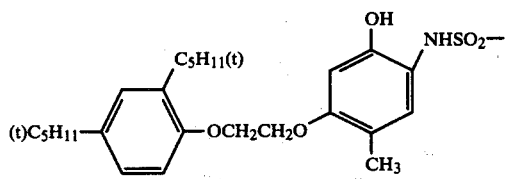

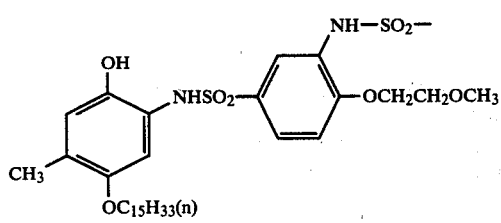

This Y—J$_n$— is described in detail in Japanese Patent O.P.I. Publications No. 104343/1976 and No. 4673/1978.

In addition, as the Y—J$_n$— applying to this type of compounds, there is a group having the formula (8)

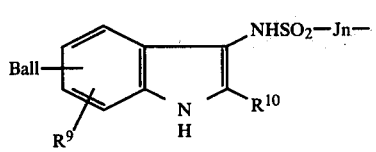

Formula (8)

wherein Ball, J, and n are the same as those defined in Formula (6), R$^9$ is hydrogen, halogen, an alkyl or alkoxy, R$^{10}$ is an alkyl, phenyl (including substituted phenyl), carbamide, or hydrogen.

Examples of the Y—J$_n$— include the following groups:

This Y—J$_n$— is described in detail in Japanese Patent Application No. 162940/1975.

Further, as the Y—J$_n$— applying to this type of compounds, there is a group having the formula (9)

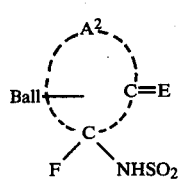

Formula (9)

wherein Ball, J and n are the same as those defined in Formula (6), E is oxygen or NE' (wherein E' is hydroxy or substituted or nonsubstituted amino group), A$^2$ is a saturated or unsaturated nonaromatic hydrocarbon in the form of 5- to 7-member ring, the hydrocarbon ring may be fused cooperatively at an appropriate position thereof with an aromatic hydrocarbon ring or a heterocyclic ring to form a condensation ring, and F is hydrogen or a halogen such as fluorine, chlorine, bromine. Groups of this type include the following examples:

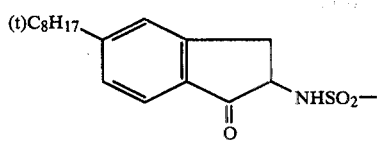

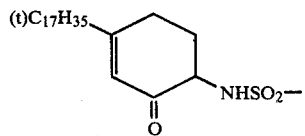

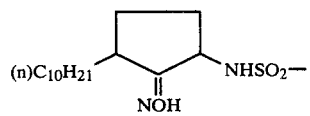

Y—J$_n$— of this kind is described in detail in Japanese Patent O.P.I. Publication No. 3819/1978.

As another compound represented by Formula (1) of the present invention, there is one wherein the ballasting carrier or carrier in Formula (1) releases diffusible azo dye as a reversed function of the development in an alkaline condition of the silver halide emulsion layer; this is called the positive image formable dye releasing compound.

As Y applicable to such type of compounds, one having the formula (10) can be mentioned.

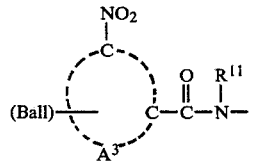

Formula (10)

wherein Ball is the same as what is defined in Formula (6), A$^3$ represents an atomic group necessary to complete benzene ring (including those having various substituents on this ring), the benzene ring being permitted to be condensed at an appropriate position thereof with a carbon ring or heterocyclic ring, R$^{11}$ represents an alkyl (including substituted alkyl). Examples of the group represented by Formula (10) include the following:

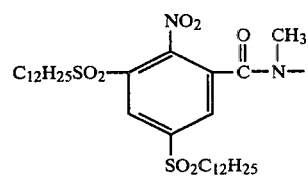

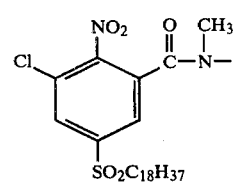

This Y is described in detail in Japanese Patent O.P.I. Publication No. 110828/1978.

As a second one of Y of this kind, there is a group having the formula (11)

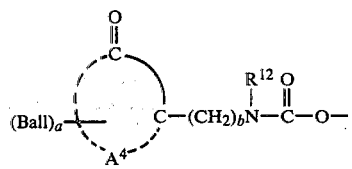

Formula (11)

wherein Ball is the same as what is defined in Formula (6), A$^4$ is quinone nuclues (including those having various substituents on this), b is an integer of 1 or 2, R$^{12}$ is an alkyl or substituted alkyl having 1 to 40 carbon atoms or an aryl or substituted aryl having 6 to 40 carbon atoms, and a is zero or 1, the a being 1 when R$^{12}$ is a group having 8 or less carbon atoms.

Examples of the group represented by Formula (11) include the following:

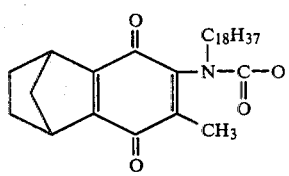

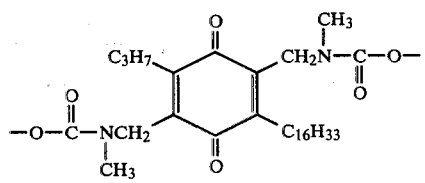

This Y is described in detail in Japanese Patent O.P.I. Publication No. 110827/1978.

Further, as a third one of Y of this kind, there is a group having the formula (12)

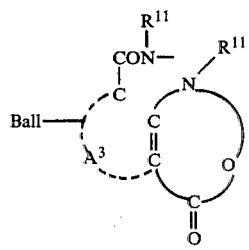

Formula (12)

wherein Ball, A$^3$ and R$^{11}$ are the same as those defined in Formula (10).

Examples of the group represented by Formula (12) include the following:

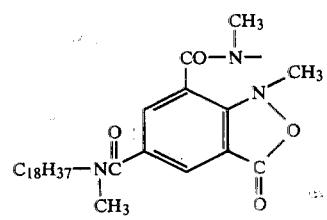

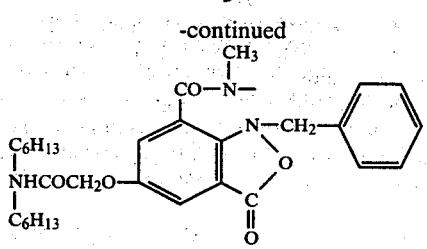

This kind of Y is described in detail in Japanese Patent O.P.I. Publication No. 111628/1974.

Further, as Y of this kind, there is a group having the formula (13)

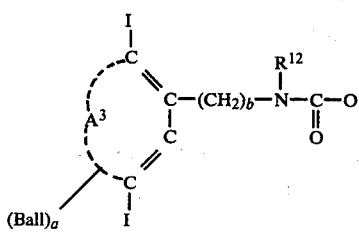

Formula (13)

wherein Ball, $R^{12}$, a and $A^3$ are the same as those defined in Formula (11), I is OH or a hydrolyzable precursor thereof. Examples of the compound represented by Formula (13) include the following:

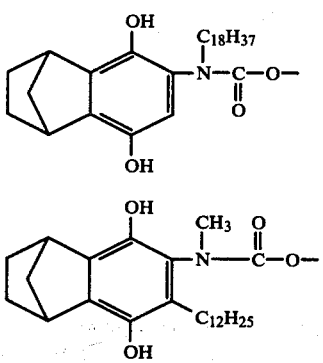

This kind of Y is described in detail in Japanese Patent O.P.I. Publication No. 6318/1976.

As another preferred group of this kind, there is also a group having the formula (14)

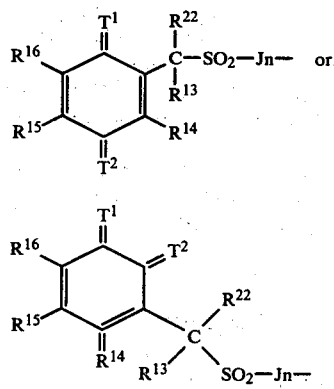

Formula (14)

wherein $T^1$ and $T^2$ each is 0 or NH, the $T^1$ and $T^2$ being permitted to be either the same or different from each other, $R^{22}$ and $R^{13}$ each is hydrogen or an alky, $R^{14}$, $R^{15}$ and $R^{16}$ each is hydrogen, halogen, an alkyl, alkoxy, or acylamino, or two adjacent groups of the $R^{14}$, $R^{15}$ and $R^{16}$ may couple with each other to form a fused ring, and at least one of $R^{12}$, $R^{13}$, $R^{14}$, $R^{15}$ and $R^{16}$ is the Ball as defined in Formula (6). Groups represented by Formula (14) include the following:

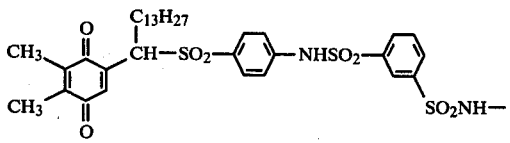

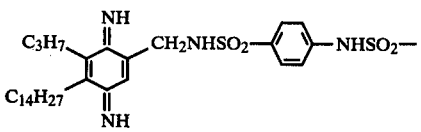

This kind of $Y-J_n-$ is described in detail in Japanese Patent O.P.I. publication No. 130927/1979

As the Y of another compound represented by Formula (1) of the present invention used for a compound that is reduced in an alkaline condition to release a diffusible dye, there is a group having the formula (15)

Formula (15)

$$[Me(Lig^a)_p(Lig^b)_q(Lig^c)_r(Lig^d)_s](B)_t$$

wherein Me is a transition metal (such as, e.g., nickel, cobalt), $Lig^a$ and $Lig^b$ each is a multidentate ligand, $Lig^c$ and $Lig^d$ each is a coordinatable ligand, B is a counter ion, P is an integer of 1 to 3, q is an integer of zero to 2 (provided that when q is zero, p is an integer of at least 2 or more), r and s each is an integer of zero to 4, and t is an integer of zero to 6.

Compounds having Formula (15) are described in detail in the Japanese Patent Application specification we filed on 23rd of November 1980.

Groups having Formula (15) include the following group:

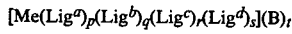

$[Co(H_2NCH_2CH_2NH)_3]cl_2$

Those compounds having the above-mentioned Formulas (10), (11), (14) and (15) may be used in a photographic element in the same way as in other nondiffusible dye releasing agents. The compound, when reduced in an alkaline condition, as the function of the development of a silver halide, releases a metallic complex formable azo dye. In this example, the compound may be applied not only to direct positive emulsions but also to conventional negative silver halide emulsions.

Another type of compounds having Formula (1) include nondiffusible compounds (dye releasing couplers) which release diffusible azo dyes at the time of the coupling reaction with the oxidized product of a color developing agent oxidized by a silver halide. As the Y which is effective for the compound, there are compounds represented by the formula (16)

Formula (16)

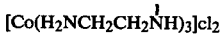

(Ball—Coup)$_e$—Link— wherein Ball is the same as defined in Formula (1), Coup is the residual group of a coupler capable of coupling with the oxidized product of a color developing agent, Link is a group (such as azo, azoxy, —O—, alkylidene, —S—, —NHSO$_2$) which is coupled with the Coup portion at the active site thereof, the bondage between the group and the Coup portion being cleavable at the time of the coupling reaction of a dye image forming compound represented by Formula (1) having the Y represented by Formula (16) with the oxidized product of a color developing agent, and e, when Link is an alkylidene, is an integer of 1 or 2, while in the case of other groups, is the integer of 1.

The Y useful for this is described in U.S. Pat. No. 3,227,550.

In order to form a color photographic image in accordance with the present invention, for example, procedures (1)–(4) described below may be used:

(1) The imagewise light-exposed portion of the above-described photographic light-sensitive element is processed in the presence of a silver halide developing agent with alkaline processing composition, thereby developing the exposed area of a plurality of silver halide emulsion layers, (2) at this time, the foregoing dye releasing compounds, as the function of development of each silver halide emulsion layer, release image-wise the diffusible ago dye.

(3) at least part of the imagewise distribution of each of the azo dyes then diffuses into the dye image receiving layer, and (4) the resulting imagewise distributed azo dyes are brought into contact with metallic ions to thereby form a metal complexed azo dye-transfer image.

Another preferred color transfer image formation of the present invention may be carried out by use of the following procedures (1)–(5):

(1) The imagewise exposed portion of the compounds inside the foregoing photographic light-sensitive element, in the presence of a silver halide developing agent, is processed with an alkaline processing composition to develop the respective exposed silver halide emulsion layers, thereby oxidizing the developing agent, (2) the oxidized developing agent is then cross-oxidized with a dye releasing compound, (3) the cross-oxidized dye releasing compound cleaves as a result of hydrolysis in alkaline solution to release diffusible azo dyes as the function of the imagewise exposure of the respective silver halide emulsion layers, (4) at least part of each of the resulting azo dyes is then diffused into the image receiving layer, and (5) the resulting imagewise distributed azo dye image is brought into contact with metallic ions, thereby forming a metal complexed azo dye transfer image.

The azo dye released from the nondiffusible compound in accordance with the present invention provides tridentate ligand which forms coordination complex with multivalent metallic ions in the image receiving layer. The metallic ions may either be present in the image receiving layer or be present in the layer adjacent thereto. In addition, the image receiving layer, after dye diffusion took place, may be brought into contact with the metallic ions in a bath. Multivalent metals most effective for the present invention should react quickly with the released dye to form a complex having a desirable hue, be strongly coordinated with a ligand, be in a stable oxidized condition, be stable against light, heat and chemicals, be substantially colorless during being present in the image receiving portion, and be inert against the silver halide layer. Those multivalent metals having such characteristics include copper (II), nickel (II), palladium (II), zinc (II), platinum (II) and cobalt (II). Of these, most preferred ones are copper (II) and nickel (II).

As compounds to be used for the layer containing such metals, there may be used those polymers having a metallic complex formable ligand. Examples of such compounds include those polymers having the formula (17)

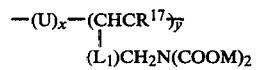

Formula (17)

wherein U is

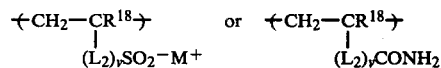

(wherein $R^{18}$ is an alkyl, $L_2$ is a divalent coupling group, M is hydrogen, ammonium cation or alkali metal, and v is an integer of zero or 1), $L_1$ is a divalent linking group, $R^{17}$ is an alkyl, x is 20 to 95% by wt. and Y is 80 to 5% by wt.

In addition, as another example, there are those polymers having the formula (18)

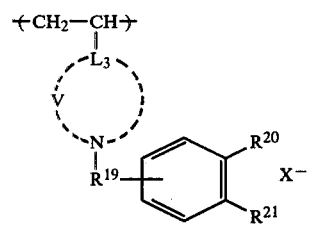

Formula (18)

wherein $L_3$ is a monovalent or divalent linking group, V is an atomic group necessary for completing the heterocyclic ring, $R^{19}$ is a monovalent or an alkylene group, $R^{20}$ and $R^{21}$ each is an independent chelating group, and $X^-$ is an anion.

These compounds are described in detail in Japanese Patent O.P.I. Publication No. 48210/1980.

As the method for supplying such metallic ions, in addition to the use of the foregoing ligand polymer, there are a way to incorporate the metallic complex of bis(acetylacetonate) into a mordant layer and a way to form a metallic complex by, after diffusion transfer, immersing the dye image into an aqueous solution containing metallic ions.

The complex formable azo dye of the present invention is coordinated with a multivalent metal to form, e.g., a complex having the formula

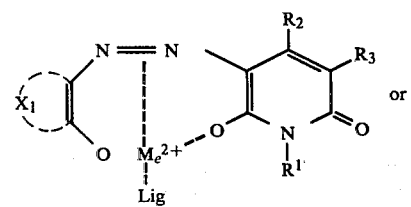

or

-continued

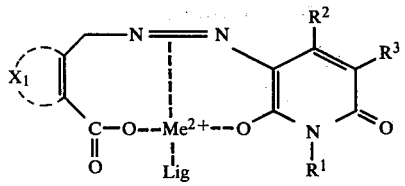

wherein $X_1$, $R_1$, $R_2$ and $R_3$ are the same as those defined in Formula (1), $Me^{2+}$ is divalent metallic ions (such as, e.g., nickel, cobalt), Lig is one or more ligands depending on the coordination number of metal, such as, e.g., $H_2O$, $Cl^-$.

After the above photographic element is processed and the processed image is transferred, the undiffused residual image distribution and developed silver still remain in the element. The residual silver and silver halide, when removed by a known method in the photographic field, enables to obtain a color image formed from the residual nondiffusible azo dye compound.

The thus produced dye is treated to form a metallic complex to thereby obtain a satisfactory light-resistant azo dye. Further, the imagewise distributed azo dye is not transferred by diffusing into a bath or the like to thereby obtain a residual image. If a negative type silver halide emulsion is applied to the above-described kind of preferred light-sensitive element, a positive color image may be obtained, while if a direct positive silver halide emulsion is applied, a negative color image may be obtained.

The photographic light-sensitive element, in order for the development process to be carried out or initiated in a discretional manner, is processed with an alkaline processing composition. A preferred way to apply the alkaline processing composition may be carried out by the use of a rupturable container or pod. The processing composition applicable to the present invention generally contains a developing agent for development, but the composition may also be composed of an alkaline solution alone. In the latter case, the developing agent may be contained in the photographic element, image receiving layer or processing sheet. In this case, the alkaline solution serves to activate the developing agent contained in the foregoing element or sheet.

The photographic film unit capable of being processed in accordance with the present invention suited to be processed, for example, by putting through a pair of juxtaposed pressure applying members as seen in a camera designed so as to make processings thereinside. The photographic film unit is composed of:

(1) a photographic element as aforementioned,
(2) an image receiving layer, and
(3) an alkaline processing composition and a means to release the composition inside the film unit such as, for example, a rupturable container suited to be led to a subsequent condition during the processing of the film unit; as a pressure force is applied by means of pressure applying members to the container, the content of the container is released inside the film unit.

In addition, the film unit contains a silver halide developing agent.

The dye image receiving layer of the above-described film unit may be provided on another support prepared so that the image receiving layer, after exposure, may be superposed on the photographic element. Such an image receiving element is disclosed in, e.g., U.S. Pat. No. 3,362,819. In the case where the means to release the processing composition is a rupturable container, the container containing the processing composition is placed between the photographic element and the image receiving element, and a pressure force is applied to the container by means of pressure applying members (such as, e.g., those observed in cameras capable of performing processings thereinside), whereby the content of the container is released between the image receiving element and the outermost layer of the photographic element. After the processing, the dye image element is peeled apart from the photographic element.

Those examples of the nondiffusible dye releasing compound having Formula (1) and of the diffusible azo dye released from the nondiffusible dye releasing compounds represented by Formulas (2) and (3) are then indicated below:

Nondiffusible dye releasing compounds

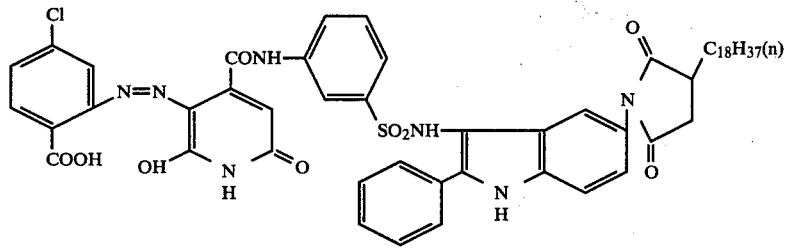

Compound (1)

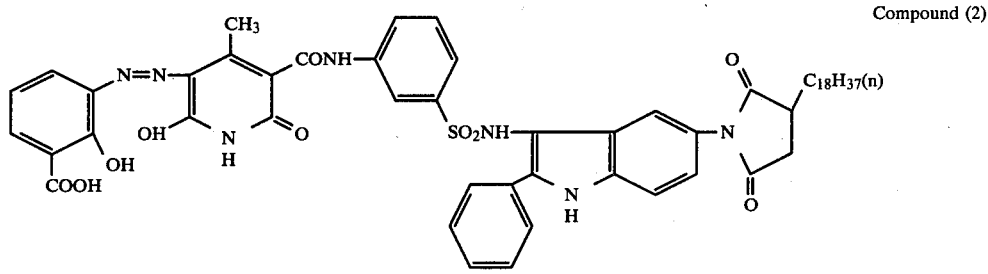

Compound (2)

-continued
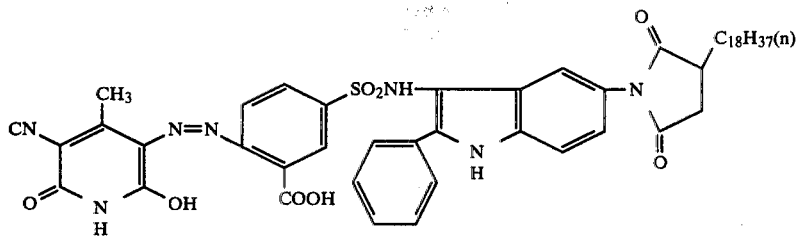
Compound (3)
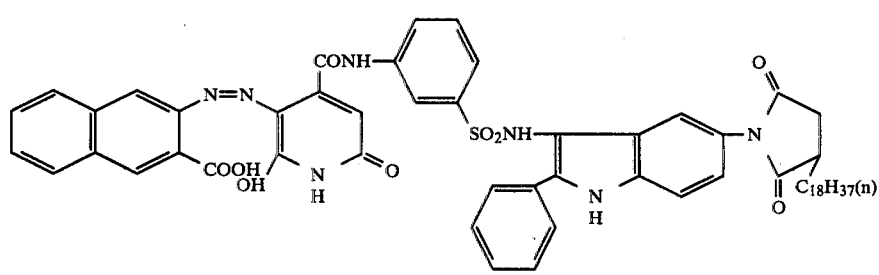
Compound (4)
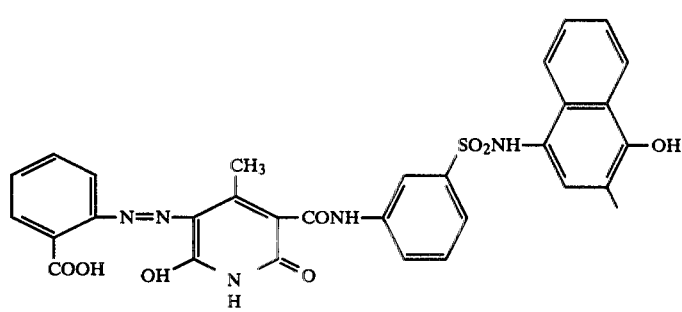
Compound (5)
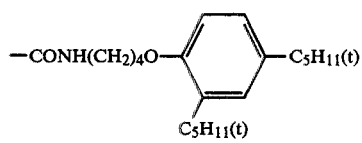
Diffusible azo dyes
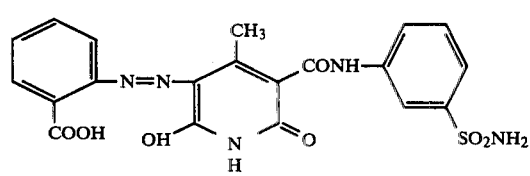
Compound (6)
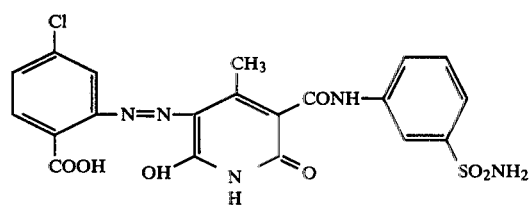
Compound (7)
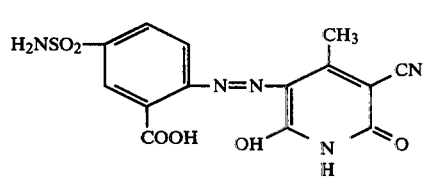
Compound (8)

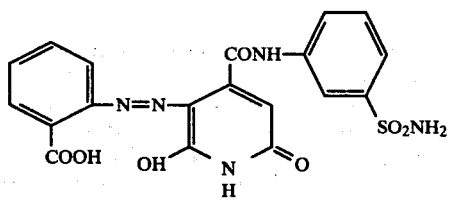

Compound (9)

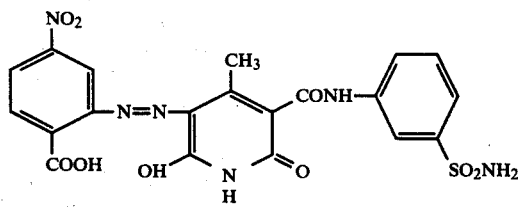

Compound (10)

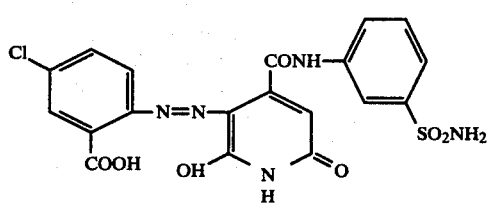

Compound (11)

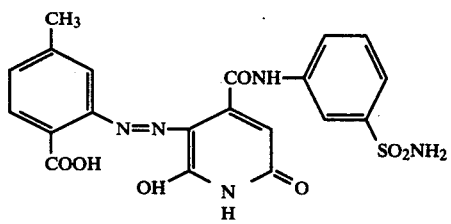

Compound (12)

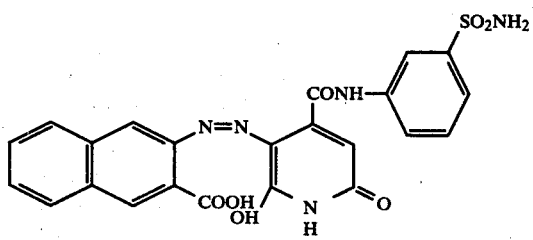

Compound (13)

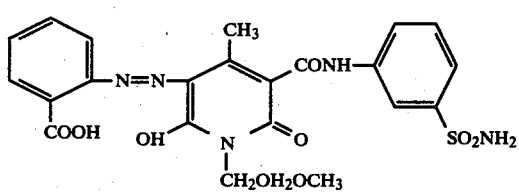

Compound (14)

SYNTHESIS EXAMPLES

Synthesis of Compound (1)

0.857 g (0.005 mole) of 4-chloroanthranilic acid was added to 7.5 ml of water and to the solution was added 1.1 ml of concentrated hydrochloric acid. After cooling the mixture to 0° C., an aqueous solution of 0.295 g of sodium nitrite dissolved into 2 ml of water kept at a temperature of less than 5° C. was slowly added dropwise to the mixture. After that the mixture was then stirred at 0° C. for 30 minutes and the resulting solution was added at a temperature of less than 10° C. to a solution of 0.245 g (0.05 mole) of 2-hydroxy-4[N-{3-(5-octadecyl succinimide-2-phenyl-indole-3-amino) sulfonyl-phenyl}carbamoyl]-6-pyridone and 1.5 g of sodium hydroxide dissolved into 50 ml of water. Subsequently to the dropwise addition the mixture solution was stirred at room temperature for a period of one hour and then cooled, to which was then slowly added 5 ml of concentrated hydrochloric acid to deposit a precipitate. The precipitate was refined by column chromatography, thereby producing 4.1 g of an objective product whose m.p. was 247° to 251° C.

Synthesis of Intermediate (1), 5-octadecyl succinimide-2-phenyl-3-{N-(3-aminobenzene sulfonyl)amino}indole To 200 cc of a chloroform were added 22.28 g (0.04 mole) of 5-octadecyl succinimide-2-phenyl-3-aminoindole and 9.1 g (0.01 mole) of m-nitrobenzene sulfonic acid chloride, and to the mixture solution were dropwise added 3.24 g of pyridine under nitrogen gas flow, and stirred over a period of 4 hours, and the thus deposited Precipitate was filtered, whereby 18 g of crude crystals of 5-octadecyl succinimide-2-phenyl-3-{N-(3-nitrobenzene sulfonyl)amino}indole were obtained. 16 g of the obtained crystals were added to 140 ml of acetone, and to the solution were added 3.5 g of zinc powder and 7 ml of hydrochloric acid at a temperature of from 15° to 20° C. and, keeping the temperature, further added alternately 5.7 g of zinc powder and 15 ml of hydrochloric acid. This was stirred for 30 minutes after the addition and was added with stirring to 100 ml of water to deposit crystals. The crystals were centrifugally separated, stirred, washed, refined by column chromatography, and then dried, thereby obtaining 12.8 g of an objective product.

Synthesis of Intermediate (2), 2-hydroxy-4[N-{3-(5-octadecyl succinimide-2-phenyl-indole-3-amino)sulfonyl-phenyl}-carbamoyl]-6-pyridone 11.4 g (0.016 mole) of octadecyl succinimide-2-phenyl-3{N-(3-aminobenzene sulfonyl)amino}indole and 4.464 g (0.0288 mole) of citrazinic acid were added to 30 ml of toluene, and the mixture was heated at about 110° C. After removing the thus distilling water, the toluene was distilled off to obtain crystals, which was then refined by column chromatography, whereby 4.8 g of an objective product was obtained.

And other compounds were also able to be synthesized in like manner.

The present invention is illustrated with reference to examples below, but the present invention is not limited thereto.

EXAMPLE 1

Tests of Photographic Element

A dyed film strip containing a mixture of gelatin with a latex mordant (ratio by weight 1:1) (these components each was coated on a transparent polyester support in the coating amount 2.5 g/m²) was tested for the hue, resistance to light, and pH dependability with the use of a spectrophotometer.

The latex mordant herein used is poly(styrene-co-vinylbenzyl chloride-co-N-benzyl-N,N-dimethyl-N-vinyl-benzyl ammonium chloride-co-divinyl benzene) (molar ratio—4.90:0.49:4.41:0.2) which is disclosed in Japanese Patent O.P.I. Publication No. 73440/1976 by Gerald, Allan, Campbell et al.

The dye was first dissolved into a 0.86 N aqueous potassium hydroxide solution, and an undyed mordant strip was dipped into the dye solution, which dipping was repeated until the transmission density of about 1.0 was obtained. The strip was subsequently washed and then immersed in an aqueous solution containing metallic ions (divalent copper and divalent nickel) for about 10 minutes to thereby form a complete metallic complex. The strip was then washed and thereafter immersed in a standard buffer solution having a given pH to be equilibrated thereto for about 5 minutes and then dried.

A. Hue

The absorption spectrum of the dye dyed to the mordant on the transparent support was measured in transmission by means of a spectrophotometer. Herein the term "Hue" is used in terms of λmax, which is the wavelength at which spectral absorption is maximum, Half-bandwidth(½ BW), and One third-bandwidth(⅓ BW), which respectively mean width of wavelength at which the spectral absorption becomes ½ and ⅓ of that of λmax. Thus the smaller ½ BW and ⅓ BW values, the brighter and purer the color is. Preferable ½ BW value is 10 to 100 nm and ⅓ BW value is preferably not greater than ½ BW value by 25 nm.

B. pH Dependability of Hue

The dye released from the nondiffusible dye releasing compound is alkaline during the processing and becomes as acidic as about pH 4 as time goes by. Therefore, the dye should show a stable hue over a wide pH range. Table 1 shows the range in which the respective dyes maintain preferred stable hues in the condition that they are dyed to the mordant.

C. Light Fastness

The dyed strip film was exposed to light and the light-resistant property of the dye formed was measured in accordance with the following procedure:

A dyed strip piece having the transmission density of about 1.0 to 1.5 was exposed over a period of 48 hours to a 6000 W xenon lamp (the illuminance on the surface of the strip film: 60,000 1x.), and preexposure and postexposure optical densities (preexposure density: $D_o$, postexposure:

(D) at λmax were measured to obtain the value of $D/D_o \times 100$ as the residual rate (%); the results of the measurements made on the respective dyes are shown in Table 1.

D. Image Forming Rate of DRR Compounds

The following multilayered monochromatic light-sensitive element was prepared. The dye image after being subjected to a given processing is observed through the transparent support of the light-sensitive element, but the changes in reflection densities of the dye appearing on the mordant layer were trackingly measured by means of a photoelectric densitometer (Sakura Photoelectric Densitometer PDA-60), thereby recording densities at 30 seconds, 60 seconds and 120 seconds after the foregoing processing. These densities are given in percentage to the final density (obtained at 15 minutes after the processing) in Table 2, which shows that the higher the value, the faster is the rate of the transfer to the mordant layer.

Preparation of Multilayered Monochromatic-Light-sensitive Element

The following layers were coated in order on a 150 μm-thick transparent polyethylene terephthalate film support, thereby preparing a multilayered monochromatic light-sensitive element;

(1) An image receiving layer with the dried thickness of 2.5–3.0 μm having 2.5 g/m² each of gelatin and poly(styrene-co-vinyl benzyl chloride-co-N-benzyl-N,N-dimethyl-N-vinyl benzyl ammonium chloride-co-divinyl benzene) (molar ratio—4.90:0.49:4.41:0.2).

(2) A light-reflection layer with the dried thickness of 7–8 μm having titanium dioxide (22 g/m²) and gelatin (2.2 g/m²).

(3) An opaque layer with the dried thickness of 4 μm having carbon black (2.8 g/m²) and gelatin (1.8 g/m²).

(4) A magenta dye forming material layer with the dried thickness of 2.2 μm having compounds (1)–(3) (1 m mol/m$^2$), N,N-diethyl-laurylamide (1.1 g/m$^2$) and gelatin (2.5 g/m$^2$).

(5) A blue-sensitive emulsion layer with the dried thickness of about 1.5 μm having blue-sensitive internal latent image type direct positive AgBr emulsion (1.48 g/m$^2$ silver equivalent), potassium 2-octadecyl hydroquinone-5-sulfonate (0.1 g/m$^2$), formyl-4-methylphenyl hydrazide (13 mg/m$^2$) and gelatin (1.65 g/m$^2$).

(6) A protective layer with the dried thickness of 0.7 μm having mucochloric acid (100 mg/m$^2$) and gelatin (1 g/m$^2$).

Meanwhile, a dispersion liquid of the DRR compound was herein prepared in the following manner.

One gram of a DRR compound was dissolved into 3 ml of ethyl acetate, and to the solution was added N,N-diethyl laurylamide, and the resulting solution was emulsifiedly dispersed into 25 ml of a 10% aqueous gelatin solution containing 0.24 g of Alkanol XC (manufactured by DuPont).

In the case of a DRR compound less-soluble in ethyl acetate, cyclohexane was used.

Subsequently, on a 100 μm-thick transparent polyethylene terephthalate film support, the following layers were coated in order, thereby preparing a processing sheet:

(1) A neutralizing layer with the dried thickness of 22.0 μm having a copolymer of acrylic acid with butyl acrylate (75/25% by weight) (22 g/m$^2$).

(2) A timing layer (the lower layer of a two-layer component) with the dried thickness of 5.0 μm having cellulose diacetate (acetylation degree: 40%) (5 g/m$^2$).

(3) Another timing layer (the upper layer of a two-layer component) with the dried thickness of 1 μm having poly(vinylidene chloride-co-acrylonitrile-co-acrylic acid) (79/15/6% by weight) (1.1 g/m$^2$).

The previously prepared multilayered monochromatic light-sensitive element was subjected to a given exposure through a 30-step optical silver wedge with each step differential in density of 0.15. The foregoing processing sheet was then superposed on the exposed element, and further a pod containing about 1.0 ml of the following composition was placed between and attached to the foregoing superposed sheet and element to thereby prepare a film unit. The prepared film unit was subsequently passed through a pair of pressurizedly juxtaposed rollers with the gap of about 340 μm therebetween to thereby rupture the pod to spread the content thereof between the foregoing light-sensitive element and processing sheet.

The composition of the processing composition used herein are as follows:

| | |
|---|---|
| Potassium hydroxide | 56.0 g |
| Sodium sulfite | 2.0 g |
| 4-hydroxymethyl-4-methyl-1-phenyl-3-pyrazolidone | 8.0 g |
| 5-methyl benzotriazole | 2.8 g |
| Carbon black (Raven-450, manufactured by Columbian Carbon) | 150.0 g |
| Carboxy-methyl cellulose sodium salt (of high viscosity type, manufactured by Tokyo Chemical Industry Co., Ltd.) | 50.0 g |
| Benzyl alcohol | 1.5 ml |
| Add distilled water to make | 1000.0 ml |

Several minutes after the spread, a dye image was observed through the transparent support of the light-sensitive element.

TABLE 1

| Compound No. | Chelating metal | Hue of dye λmax(nm) | ½BW(nm) | ⅓BW(nm) | Light resistance $D/D_o \times 100$ | Good hue showing pH range |
|---|---|---|---|---|---|---|
| 6 | Free | 448 | 83 | 105 | 70 | 2 ~ 12 |
|   | Cu$^{2+}$ | 439 | 77 | 105 | 100 | 2 ~ 12 |
|   | Ni$^{2+}$ | 452 | 82 | 110 | 100 | 2 ~ 12 |
| 7 | Free | 445 | 83 | 116 | 53 | 2 ~ 12 |
|   | Cu$^{2+}$ | 447 | 79 | 106 | 100 | 2 ~ 12 |
|   | Ni$^{2+}$ | 440 | 97 | 122 | 75 | 2 ~ 8 |
| 8 | Free | 442 | 85 | 117 | 65 | 2 ~ 8 |
|   | Cu$^{2+}$ | 440 | 82 | 115 | 100 | 2 ~ 12 |
|   | Ni$^{2+}$ | 438 | 88 | 120 | 96 | 2 ~ 12 |
| 9 | Free | 431 | 69 | 87 | 70 | 2 ~ 12 |
|   | Cu$^{2+}$ | 436 | 66 | 71 | 100 | 2 ~ 12 |
|   | Ni$^{2+}$ | 434 | 68 | 76 | 97 | 2 ~ 12 |
| 10 | Free | 438 | 75 | 101 | 74 | 2 ~ 12 |
|   | Cu$^{2+}$ | 440 | 70 | 91 | 96 | 2 ~ 12 |
|   | Ni$^{2+}$ | 444 | 78 | 102 | 92 | 2 ~ 8 |
| 11 | Free | 434 | 71 | 89 | 77 | 2 ~ 12 |
|   | Cu$^{2+}$ | 438 | 72 | 80 | 99 | 2 ~ 10 |
|   | Ni$^{2+}$ | 444 | 72 | 95 | 98 | 2 ~ 12 |
| 12 | Free | 433 | 78 | 103 | 69 | 2 ~ 12 |
|   | Cu$^{2+}$ | 440 | 74 | 94 | 100 | 2 ~ 12 |
|   | Ni$^{2+}$ | 437 | 80 | 98 | 100 | 2 ~ 12 |
| 13 | Free | 453 | 93 | 110 | 59 | 2 ~ 12 |
|   | Cu$^{2+}$ | 457 | 84 | 112 | 98 | 2 ~ 10 |
|   | Ni$^{2+}$ | 453 | 82 | 105 | 93 | 2 ~ 12 |
| 14 | Free | 434 | 81 | 98 | 75 | 2 ~ 8 |
|   | Cu$^{2+}$ | 446 | 70 | 88 | 100 | 2 ~ 8 |
|   | Ni$^{2+}$ | 442 | 75 | 92 | 97 | 2 ~ 10 |

TABLE 2

| Compound No. | Diffusibility 30 sec. | 60 sec. | 120 sec. |
|---|---|---|---|
| 1 | 32% | 59% | 89% |
| 3 | 36 | 62 | 91 |
| 5 | 27 | 55 | 83 |

TABLE 3

| Compound No. | Molar Extinction Coefficient ($\epsilon$) |
|---|---|
| 6 | $4.2 \times 10^4$ |
| 9 | $3.9 \times 10^4$ |
| 13 | $4.4 \times 10^4$ |
| *15 | $2.2 \times 10^4$ |

*15 Control Compound

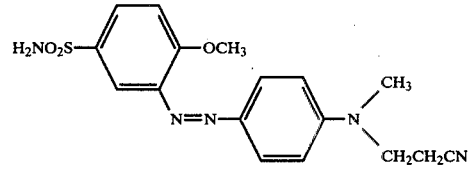

We claim:

1. A photographic light-sensitive element which comprises on a support a light-sensitive silver halide emulsion layer and having associated therewith a nondiffusible compound capable of, under alkaline condition, releasing a diffusible azo dye, said compound having the formula (1),

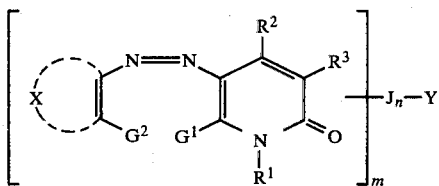

wherein X represents a group of atoms necessary to complete a naphthalene ring or a benzene ring, $G^1$ represents a hydroxy group, a salt thereof or a hydrolyzable precursor thereof, $G^2$ represents a carboxy group, a salt thereof or a hydrolyzable precursor thereof, a hydroxy group, a salt thereof or a hydrolyzable precursor thereof, $R^1$ is a hydrogen atom, an alkyl group or an aryl group, $R^2$ represents a hydrogen atom, a halogen atom, an alkyl group, a carboxy group, a carbamoyl group or an amino group, each of which group may be substituted, $R^3$ represents a hydrogen atom, a carboxy group, a carbamoyl group, a cyano group or a trifluoromethyl group, J represents a divalent linking group, Y represents a ballasted carrier moiety capable of releasing said diffusible dye under alkaline condition as a function of development of silver halide, m represents an integer of 1 to 3 and n represents zero or an positive integer not larger than m.

2. A photographic light-sensitive element according to claim 1, wherein said diffusible azo dye has the formula (2)

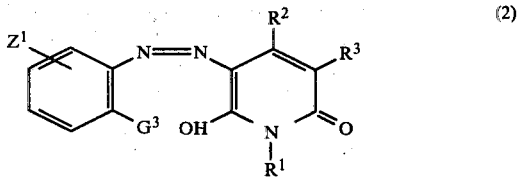

wherein $Z^1$ is a substituent capable of providing a color in cooperation with $R^1$, $R^2$ or $R^3$, $G^3$ represents a carboxy group or a hydroxy group and $R^1$, $R^2$ and $R^3$ respectively represent the same atom or group as defined in claim 1.

3. A photographic light-sensitive element according to claim 1, wherein said diffusible azo dye has the formula (3)

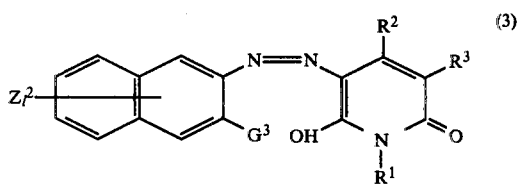

wherein $G^3$ is a carboxy group or a hydroxy group; $R^1$, $R^2$ and $R^3$ respectively represent the same atom or group as defined in claim 1, $Z^2$ represents a hydrogen atom, a halogen atom, a nitro group or a sulfamoyl group and L represents an integer of 1 or 2.

4. A photographic light-sensitive element according to claim 1, wherein —J— in formula (1) is a divalent linking group represent by the general formulas

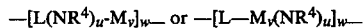

wherein L represents a divalent group represented by the general formula —$R^5$—(O)$_x$—$R^6$y—, wherein $R^5$ and $R^6$ independently represent a phenylene group, an alkylene group, or an arylene-alkylene group, each of which group may be substituted, x and y independently represent an integer of zero or 1, M represents a carbonyl or a sulfonyl group, $R^4$ is a hydrogen atom, or an alkyl which may be substituted, u and v independently represent an integer of zero or 1 and w is an integer of zero, 1 or 2 provided that when the w is an integer of 2, L, $R^4$ and M may be either same or different from one another.

* * * * *